United States Patent
Le et al.

(10) Patent No.: US 12,122,114 B2
(45) Date of Patent: *Oct. 22, 2024

(54) METHOD FOR THE MANUFACTURE OF A PLASTIC COMPONENT, PLASTIC COMPONENT, MIDSOLE AND SHOE

(71) Applicant: adidas AG, Herzogenaurach (DE)

(72) Inventors: Tru Huu Minh Le, Herzogenaurach (DE); Amir Fathi, Herzogenaurach (DE); Christopher Edward Holmes, Herzogenaurach (DE); Andreas Johannes Seefried, Herzogenaurach (DE); Norbert Reuber, Kreuzwertheim (DE); Constantin Joachim Nikolas Kemmer, Kreuzwertheim (DE); Victor Romanov, Kreuzwertheim (DE)

(73) Assignee: adidas AG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,773

(22) Filed: Oct. 29, 2022

(65) Prior Publication Data
US 2023/0049269 A1   Feb. 16, 2023

Related U.S. Application Data

(63) Continuation of application No. 16/465,485, filed as application No. PCT/EP2017/080420 on Nov. 24, 2017, now Pat. No. 11,504,928.

(30) Foreign Application Priority Data

Dec. 1, 2016 (DE) .......................... 102016223980.5

(51) Int. Cl.
*B29D 35/14* (2010.01)
*A43B 13/04* (2006.01)
(Continued)

(52) U.S. Cl.
CPC ............ *B29D 35/142* (2013.01); *A43B 13/04* (2013.01); *A43B 13/125* (2013.01);
(Continued)

(58) Field of Classification Search
CPC ..... B29C 70/40; B29C 70/34; B29C 49/4802; B29C 44/3476; B29C 44/3461;
(Continued)

(56) References Cited

U.S. PATENT DOCUMENTS

| | | |
|---|---|---|
| 1,855,098 A | 4/1932 | Collins |
| 2,787,809 A | 4/1957 | Stastny |

(Continued)

FOREIGN PATENT DOCUMENTS

| | | |
|---|---|---|
| AT | 505333 | 12/2008 |
| CN | 1087573 | 6/1994 |

(Continued)

OTHER PUBLICATIONS

Office Action, Japanese Patent Application No. 2019-529554, Sep. 8, 2020, 12 pages.
(Continued)

*Primary Examiner* — Stella K Yi
(74) *Attorney, Agent, or Firm* — Kilpatrick Townsend & Stockton LLP

(57) ABSTRACT

The present invention relates to an enhanced method for the manufacture of a plastic component (135), in particular a cushioning element for sports apparel, the method comprising: opening a mold (100) by a predetermined amount into a loading position, wherein the mold comprises at least two mold parts (110, 112) and wherein the amount by which the mold is opened influences an available loading volume of the mold, loading a material comprising expanded particles (130) into the loading volume, closing the mold into a closed position, wherein during closing of the mold the mold parts (Continued)

are moved together over different distances (140) in different areas of the mold, compressing the expanded particles by closing the mold and fusing at least the surfaces of the expanded particles to mold the plastic component.

18 Claims, 4 Drawing Sheets

(51) Int. Cl.
    *A43B 13/12*     (2006.01)
    *A43B 13/18*     (2006.01)
    *B29C 35/08*     (2006.01)
    *B29C 43/02*     (2006.01)
    *B29C 44/34*     (2006.01)
    *B29C 44/44*     (2006.01)
    *B29C 44/58*     (2006.01)
    *B29C 67/20*     (2006.01)
    *B29D 35/00*     (2010.01)
    *B29D 35/12*     (2010.01)
    *B29K 67/00*     (2006.01)
    *B29K 75/00*     (2006.01)
    *B29K 77/00*     (2006.01)
    *B29K 101/12*     (2006.01)
    *B29K 105/00*     (2006.01)
    *B29K 105/04*     (2006.01)
    *B29L 31/50*     (2006.01)

(52) U.S. Cl.
    CPC ........ *A43B 13/187* (2013.01); *B29C 35/0805* (2013.01); *B29C 44/3426* (2013.01); *B29C 44/585* (2013.01); *B29C 67/205* (2013.01); *B29D 35/0054* (2013.01); *B29D 35/0063* (2013.01); *B29D 35/122* (2013.01); *B29D 35/148* (2013.01); *B29C 2035/0822* (2013.01); *B29C 2035/0827* (2013.01); *B29C 2035/0855* (2013.01); *B29C 2035/0861* (2013.01); *B29C 43/02* (2013.01); *B29C 44/445* (2013.01); *B29K 2067/003* (2013.01); *B29K 2067/006* (2013.01); *B29K 2067/046* (2013.01); *B29K 2075/00* (2013.01); *B29K 2077/00* (2013.01); *B29K 2101/12* (2013.01); *B29K 2105/0005* (2013.01); *B29K 2105/002* (2013.01); *B29K 2105/048* (2013.01); *B29K 2995/0063* (2013.01); *B29K 2995/0082* (2013.01); *B29K 2995/0094* (2013.01); *B29L 2031/504* (2013.01)

(58) Field of Classification Search
    CPC ............ B29C 44/0453; B29C 44/0446; B29C 2043/5808; B29C 43/184; B29C 2043/147; B29C 2043/144
See application file for complete search history.

(56) References Cited

U.S. PATENT DOCUMENTS

| | | |
|---|---|---|
| 3,058,162 A | 10/1962 | Grabowski |
| 3,193,876 A | 7/1965 | Thompson |
| 3,315,317 A | 4/1967 | Winkler |
| 3,413,682 A | 12/1968 | Wucher |
| 3,424,827 A | 1/1969 | Galizia et al. |
| 3,598,672 A | 8/1971 | Heller |
| 3,813,201 A | 5/1974 | Frederick et al. |
| 4,035,216 A | 7/1977 | Immel |
| 4,298,324 A | 11/1981 | Soulier |
| 4,441,876 A | 4/1984 | Marc |
| 4,483,809 A | 11/1984 | Ando et al. |
| 4,902,721 A | 2/1990 | Pham et al. |
| 5,082,436 A | 1/1992 | Choi et al. |
| 5,156,754 A | 10/1992 | Nomura et al. |
| 5,194,190 A | 3/1993 | Kim |
| 5,314,927 A | 5/1994 | Kondo et al. |
| 5,396,249 A | 3/1995 | Yamada et al. |
| 5,518,060 A | 5/1996 | Cleary et al. |
| 5,667,737 A | 9/1997 | Wittmann |
| 5,718,968 A | 2/1998 | Cutler et al. |
| 5,736,167 A | 4/1998 | Chang |
| 5,937,265 A | 8/1999 | Pratt et al. |
| 6,042,764 A | 3/2000 | Eder et al. |
| 6,086,808 A | 7/2000 | Sorensen et al. |
| 6,165,300 A | 12/2000 | Elsner et al. |
| 6,253,159 B1 | 6/2001 | Bett et al. |
| 6,346,210 B1 | 2/2002 | Swartz et al. |
| 6,432,320 B1 | 8/2002 | Bonsignore et al. |
| 6,464,922 B1 | 10/2002 | Bogdan |
| 6,800,227 B1 | 10/2004 | Nohara et al. |
| D709,680 S | 7/2014 | Herath |
| 8,922,641 B2 | 12/2014 | Bertin et al. |
| 8,958,901 B2 | 2/2015 | Regan |
| D740,003 S | 10/2015 | Herath |
| D740,004 S | 10/2015 | Hoellmueller et al. |
| 9,212,270 B2 | 12/2015 | Fubl et al. |
| D758,056 S | 6/2016 | Galway et al. |
| 9,498,927 B2 | 11/2016 | Watkins et al. |
| D776,410 S | 1/2017 | Galway et al. |
| D783,264 S | 4/2017 | Hoellmueller et al. |
| 9,610,746 B2 | 4/2017 | Wardlaw et al. |
| 9,681,709 B2 | 6/2017 | Manz et al. |
| 9,781,970 B2 | 10/2017 | Wardlaw et al. |
| 9,781,974 B2 | 10/2017 | Reinhardt |
| 9,788,598 B2 | 10/2017 | Reinhardt |
| 9,788,606 B2 | 10/2017 | Reinhardt |
| 9,795,186 B2 | 10/2017 | Reinhardt et al. |
| 9,820,528 B2 | 11/2017 | Reinhardt et al. |
| 9,849,645 B2 | 12/2017 | Wardlaw et al. |
| 9,930,928 B2 | 4/2018 | Whiteman et al. |
| 9,968,157 B2 | 5/2018 | Wardlaw et al. |
| 10,039,342 B2 | 8/2018 | Reinhardt et al. |
| D828,686 S | 9/2018 | Hoellmueller et al. |
| D828,991 S | 9/2018 | Herath |
| D840,136 S | 2/2019 | Herath et al. |
| D840,137 S | 2/2019 | Herath et al. |
| 10,259,183 B2 | 4/2019 | Wardlaw et al. |
| D851,889 S | 6/2019 | Dobson et al. |
| D852,475 S | 7/2019 | Hoellmueller et al. |
| D853,691 S | 7/2019 | Coonrod et al. |
| D853,699 S | 7/2019 | Coonrod et al. |
| 10,357,904 B2 | 7/2019 | Farris et al. |
| D855,297 S | 8/2019 | Motoki |
| 10,506,846 B2 | 12/2019 | Wardlaw et al. |
| D873,543 S | 1/2020 | Coonrod et al. |
| D875,359 S | 2/2020 | Dobson et al. |
| D882,927 S | 5/2020 | Bruns et al. |
| D882,928 S | 5/2020 | Bruns et al. |
| 10,639,861 B2 | 5/2020 | Minh Le et al. |
| 10,645,992 B2 | 5/2020 | Le et al. |
| 10,667,576 B2 | 6/2020 | Reinhardt et al. |
| D889,810 S | 7/2020 | Hoellmueller et al. |
| D891,051 S | 7/2020 | Smith et al. |
| 10,723,048 B2 | 7/2020 | Kirupanantham et al. |
| 10,730,259 B2 | 8/2020 | Kurtz et al. |
| D895,234 S | 9/2020 | Motoki et al. |
| D899,061 S | 10/2020 | Coonrod et al. |
| D906,648 S | 1/2021 | Hoellmueller |
| D915,055 S | 4/2021 | Herath et al. |
| D915,749 S | 4/2021 | Groneck |
| D916,444 S | 4/2021 | Callow et al. |
| D925,179 S | 7/2021 | Hoellmueller |
| D927,154 S | 8/2021 | Coonrod et al. |
| D928,479 S | 8/2021 | Le et al. |
| D932,760 S | 10/2021 | Thompson |
| D938,154 S | 12/2021 | Dobson et al. |
| D943,880 S | 2/2022 | Bruns et al. |
| D955,703 S | 6/2022 | Tanzini et al. |
| 11,938,697 B2 | 3/2024 | Le et al. |
| 2001/0013459 A1 | 8/2001 | Pattantyus-Abraham et al. |
| 2001/0048182 A1 | 12/2001 | Caretta et al. |

(56) References Cited

U.S. PATENT DOCUMENTS

| | | |
|---|---|---|
| 2002/0170650 A1 | 11/2002 | Chi |
| 2003/0232933 A1 | 12/2003 | Lagneaux et al. |
| 2004/0030435 A1 | 2/2004 | Popp et al. |
| 2004/0032042 A1 | 2/2004 | Chi |
| 2004/0222554 A1 | 11/2004 | Akopyan |
| 2005/0110183 A1 | 5/2005 | Buchel et al. |
| 2005/0116372 A1 | 6/2005 | Bruning et al. |
| 2005/0144034 A1 | 6/2005 | Hunter |
| 2006/0043645 A1 | 3/2006 | Goettsch et al. |
| 2007/0029698 A1 | 2/2007 | Rynerson et al. |
| 2008/0224357 A1 | 9/2008 | Allmendinger et al. |
| 2008/0277837 A1 | 11/2008 | Liu et al. |
| 2008/0282579 A1 | 11/2008 | Bobbett et al. |
| 2009/0013558 A1 | 1/2009 | Hazenberg et al. |
| 2009/0072436 A1 | 3/2009 | Dean |
| 2009/0142563 A1 | 6/2009 | Zorn et al. |
| 2010/0222442 A1 | 9/2010 | Prissok et al. |
| 2010/0239803 A1 | 9/2010 | Farkas et al. |
| 2010/0267850 A1 | 10/2010 | Yoshida et al. |
| 2011/0232008 A1 | 9/2011 | Crisp |
| 2011/0266717 A1 | 11/2011 | Nehls et al. |
| 2011/0297590 A1 | 12/2011 | Ackley et al. |
| 2012/0056345 A1 | 3/2012 | Lee |
| 2012/0205435 A1 | 8/2012 | Woerz et al. |
| 2013/0125319 A1 | 5/2013 | Regan |
| 2013/0126075 A1 | 5/2013 | Jiang |
| 2013/0150468 A1 | 6/2013 | Fussi et al. |
| 2013/0203879 A1 | 8/2013 | Rensen et al. |
| 2013/0266792 A1 | 10/2013 | Nohara et al. |
| 2013/0267639 A1 | 10/2013 | Zhuang et al. |
| 2013/0291409 A1* | 11/2013 | Reinhardt ............ A43B 17/006 36/43 |
| 2013/0333950 A1 | 12/2013 | Atkins et al. |
| 2014/0017450 A1 | 1/2014 | Baghdadi et al. |
| 2014/0110491 A1 | 4/2014 | Roberts, Jr. |
| 2014/0189964 A1 | 7/2014 | Wen et al. |
| 2014/0223673 A1 | 8/2014 | Wardlaw et al. |
| 2014/0223783 A1 | 8/2014 | Wardlaw et al. |
| 2014/0227505 A1 | 8/2014 | Schiller et al. |
| 2014/0243442 A1 | 8/2014 | Coles et al. |
| 2014/0259753 A1 | 9/2014 | Watkins et al. |
| 2014/0275306 A1 | 9/2014 | Watkins et al. |
| 2015/0038605 A1 | 2/2015 | Baghdadi |
| 2015/0076236 A1 | 3/2015 | Chen |
| 2015/0101133 A1 | 4/2015 | Manz et al. |
| 2015/0119482 A1 | 4/2015 | Kumar et al. |
| 2015/0166270 A1 | 6/2015 | Buscher et al. |
| 2015/0174808 A1 | 6/2015 | Rudolph et al. |
| 2015/0190830 A1 | 7/2015 | Regan et al. |
| 2015/0197617 A1 | 7/2015 | Prissok et al. |
| 2015/0237823 A1 | 8/2015 | Schmitt et al. |
| 2015/0344661 A1 | 12/2015 | Spies et al. |
| 2015/0366289 A1 | 12/2015 | Rustam et al. |
| 2016/0001476 A1 | 1/2016 | Sommer et al. |
| 2016/0015120 A1 | 1/2016 | Denison et al. |
| 2016/0037859 A1 | 2/2016 | Smith et al. |
| 2016/0039162 A1 | 2/2016 | Murphy et al. |
| 2016/0046751 A1 | 2/2016 | Spies et al. |
| 2016/0121524 A1 | 5/2016 | Daschlein et al. |
| 2016/0200011 A1 | 7/2016 | Rothfuss et al. |
| 2016/0227876 A1 | 8/2016 | Le et al. |
| 2016/0244583 A1 | 8/2016 | Keppeler |
| 2016/0244584 A1 | 8/2016 | Keppeler |
| 2016/0244587 A1 | 8/2016 | Gutmann et al. |
| 2016/0278481 A1 | 9/2016 | Le et al. |
| 2016/0295955 A1 | 10/2016 | Wardlaw et al. |
| 2016/0302508 A1 | 10/2016 | Kormann et al. |
| 2016/0311993 A1 | 10/2016 | Zhang et al. |
| 2016/0332379 A1 | 11/2016 | Paternoster et al. |
| 2016/0346627 A1 | 12/2016 | Le et al. |
| 2017/0015825 A1 | 1/2017 | Ting et al. |
| 2017/0253710 A1 | 9/2017 | Smith et al. |
| 2017/0259474 A1 | 9/2017 | Holmes et al. |
| 2017/0340067 A1 | 11/2017 | Dyckmans et al. |
| 2017/0341325 A1 | 11/2017 | Le et al. |
| 2017/0341326 A1 | 11/2017 | Holmes et al. |
| 2017/0341327 A1 | 11/2017 | Le et al. |
| 2018/0035755 A1 | 2/2018 | Reinhardt et al. |
| 2018/0154598 A1 | 6/2018 | Kurtz et al. |
| 2018/0206591 A1 | 7/2018 | Whiteman et al. |
| 2018/0235310 A1 | 8/2018 | Wardlaw et al. |
| 2018/0290349 A1 | 10/2018 | Kirupanantham et al. |
| 2018/0303198 A1 | 10/2018 | Reinhardt et al. |
| 2019/0021435 A1 | 1/2019 | Kormann et al. |
| 2019/0291371 A1 | 9/2019 | Wardlaw et al. |
| 2020/0044326 A1 | 2/2020 | Olfert et al. |
| 2020/0060383 A1 | 2/2020 | Le et al. |
| 2020/0113280 A1 | 4/2020 | Wardlaw et al. |
| 2020/0221820 A1 | 7/2020 | Le et al. |
| 2020/0230905 A1 | 7/2020 | Le et al. |
| 2020/0253328 A1 | 8/2020 | Reinhardt et al. |
| 2020/0307041 A1 | 10/2020 | Reuber et al. |
| 2020/0315290 A1 | 10/2020 | Reinhardt et al. |
| 2020/0329809 A1 | 10/2020 | Whiteman et al. |
| 2020/0329812 A1 | 10/2020 | Le et al. |
| 2021/0016531 A1 | 1/2021 | Kurtz et al. |
| 2021/0161249 A1 | 6/2021 | Smith et al. |

FOREIGN PATENT DOCUMENTS

| | | |
|---|---|---|
| CN | 2501679 | 7/2002 |
| CN | 2917346 | 7/2007 |
| CN | 101060963 A | 10/2007 |
| CN | 101611082 A | 12/2009 |
| CN | 202895563 U | 4/2013 |
| CN | 103507208 A | 1/2014 |
| CN | 103978620 | 8/2014 |
| CN | 104302456 A | 1/2015 |
| CN | 105209233 | 12/2015 |
| CN | 205021904 | 2/2016 |
| CN | 105520278 | 4/2016 |
| CN | 205291380 U | 6/2016 |
| CN | 108472843 A | 8/2018 |
| CN | 109318487 A | 2/2019 |
| CN | 110831733 A | 2/2020 |
| DE | 1704502 A1 | 5/1971 |
| DE | 1729011 | 6/1971 |
| DE | 3032246 | 4/1982 |
| DE | 3229762 A1 | 2/1983 |
| DE | 3437786 | 4/1986 |
| DE | 29520911 U1 | 6/1996 |
| DE | 19633467 | 2/1998 |
| DE | 19648804 | 5/1998 |
| DE | 19654860 | 5/1998 |
| DE | 19704700 | 9/1998 |
| DE | 19860611 | 3/2000 |
| DE | 10117979 A1 | 8/2002 |
| DE | 202004003679 U1 | 5/2004 |
| DE | 102004049060 | 6/2005 |
| DE | 102004028462 | 12/2005 |
| DE | 202006009569 | 8/2006 |
| DE | 202007006164 | 9/2007 |
| DE | 102006024940 | 12/2007 |
| DE | 102007054723 | 5/2009 |
| DE | 102009030678 | 4/2010 |
| DE | 102009004386 | 7/2010 |
| DE | 202011109598 | 2/2012 |
| DE | 102011108744 | 1/2013 |
| DE | 102012206094 | 10/2013 |
| DE | 102013012515 | 3/2014 |
| DE | 102013002519 | 8/2014 |
| DE | 102013108053 | 1/2015 |
| DE | 102013221018 | 4/2015 |
| DE | 102013221020 | 4/2015 |
| DE | 102014107847 | 12/2015 |
| DE | 102014216992 | 3/2016 |
| DE | 102015202013 | 8/2016 |
| DE | 102015202014 | 8/2016 |
| DE | 102015224885 | 6/2017 |
| DE | 102020110352 A1 | 10/2020 |
| EP | 0455835 A1 | 11/1991 |
| EP | 0578272 A1 | 1/1994 |
| EP | 0790010 | 8/1997 |
| EP | 0792593 | 9/1997 |

(56) References Cited

FOREIGN PATENT DOCUMENTS

| | | |
|---|---|---|
| EP | 0976518 | 2/2000 |
| EP | 1016354 | 7/2000 |
| EP | 1259365 | 11/2002 |
| EP | 1535714 | 6/2005 |
| EP | 1990170 | 11/2008 |
| EP | 2564719 | 3/2013 |
| EP | 2649896 | 10/2013 |
| EP | 2684665 | 1/2014 |
| EP | 2764972 | 8/2014 |
| EP | 2767181 | 8/2014 |
| EP | 2786670 | 10/2014 |
| EP | 2845504 | 3/2015 |
| EP | 2862467 | 4/2015 |
| EP | 2865289 | 4/2015 |
| EP | 2984956 | 2/2016 |
| EP | 3053732 A1 | 8/2016 |
| EP | 3114954 | 1/2017 |
| EP | 2767183 | 4/2017 |
| EP | 3488723 | 5/2019 |
| FR | 1484844 A | 6/1967 |
| GB | 1063353 | 3/1967 |
| GB | 12483s14 A | 9/1971 |
| GB | 1275095 A | 5/1972 |
| GB | 1417522 A | 12/1975 |
| GB | 1439101 | 6/1976 |
| JP | S48-045560 | 6/1973 |
| JP | S48-042216 | 12/1973 |
| JP | S49-020266 | 5/1974 |
| JP | S50-155569 | 12/1975 |
| JP | 54114354 | 9/1979 |
| JP | 55129004 | 10/1980 |
| JP | 5620402 | 2/1981 |
| JP | S56-77122 A | 6/1981 |
| JP | 57005009 | 1/1982 |
| JP | 57180653 | 11/1982 |
| JP | 5821304 | 2/1983 |
| JP | S58-142828 | 8/1983 |
| JP | S60-500491 | 4/1985 |
| JP | 6141402 | 2/1986 |
| JP | S63-74629 A | 4/1988 |
| JP | 6046483 | 6/1994 |
| JP | H06-218830 A | 8/1994 |
| JP | H06-305039 A | 11/1994 |
| JP | H07-59368 B2 | 6/1995 |
| JP | H07-186151 A | 7/1995 |
| JP | H08-052761 A | 2/1996 |
| JP | 08131209 | 5/1996 |
| JP | 08239570 | 9/1996 |
| JP | 09322803 | 12/1997 |
| JP | H10-058475 A | 3/1998 |
| JP | 3047622 | 4/1998 |
| JP | 10138252 A | 5/1998 |
| JP | 11129275 | 5/1999 |
| JP | 11291275 | 10/1999 |
| JP | 2000-037208 A | 2/2000 |
| JP | 2000190394 | 7/2000 |
| JP | 2000-279205 A | 10/2000 |
| JP | 2002119302 | 4/2002 |
| JP | 2002144366 | 5/2002 |
| JP | 2003135105 | 5/2003 |
| JP | 2003310302 | 11/2003 |
| JP | 2006137032 | 6/2006 |
| JP | 2007504977 | 3/2007 |
| JP | 2008544009 | 12/2008 |
| JP | 2009518495 | 5/2009 |
| JP | 2012-504024 A | 2/2012 |
| JP | 2014158708 | 9/2014 |
| JP | 2014531352 | 11/2014 |
| KR | 20100032561 A | 3/2010 |
| KR | 20160037252 A | 4/2016 |
| WO | 9420568 | 9/1994 |
| WO | 9955186 | 11/1999 |
| WO | 2002004188 | 1/2002 |
| WO | 2005026243 | 3/2005 |
| WO | 2007/082838 A1 | 7/2007 |
| WO | 2009036240 | 3/2009 |
| WO | 2011125540 | 10/2011 |
| WO | 2011134996 | 11/2011 |
| WO | 2014046940 | 3/2014 |
| WO | 2014150122 | 9/2014 |
| WO | 2015052265 | 4/2015 |
| WO | 2015052267 | 4/2015 |
| WO | 2015075546 | 5/2015 |
| WO | 2016/023067 A1 | 2/2016 |
| WO | 2016030026 | 3/2016 |
| WO | 2016030333 | 3/2016 |

OTHER PUBLICATIONS

Office Action, Chinese Patent Application No. 201780073742.9, Sep. 3, 2020, 24 pages.
U.S. Appl. No. 62/137,139, filed Mar. 23, 2015, Unpublished.
International Preliminary Report on Patentability, PCT Patent Application No. PCT/EP2017/080420, mailed Jun. 13, 2019.
International Patent Application No. PCT/EP2017/080420, International Search Report and Written Opinion mailed Mar. 29, 2018, 12 pages.
Office Action, Chinese Patent Application No. 201780073742.9, Mar. 12, 2021, 18 pages.
"Plastic", Britannica Online Encyclopedia, Available Online at: https://www.britannica.com/print/article/463684, Accessed from Internet on Aug. 17, 2016, 15 pages.
U.S. Appl. No. 29/730,512, filed Apr. 6, 2020, Unpublished.
U.S. Appl. No. 29/760,713, filed Dec. 3, 2020, Unpublished.
U.S. Appl. No. 29/767,743, filed Jan. 25, 2021, Unpublished.
Office Action, Japanese Patent Application No. 2019-529554, Aug. 17, 2021, 6 pages.
Office Action, European Patent Application No. 17816505.6, Oct. 29, 2021, 6 pages.
Dieter, "Materials Selection and Design", ASM Handbook, vol. 20, Available Online at: https://app.knovel.com/hotlink/toc/id:kpASMHVMS2/asm-handbook-volume-20/asm-handbook-volume-20, 1997.
Non-Final Office Action, U.S. Appl. No. 16/464,485, filed Sep. 21, 2021, 9 pages.
Final Office Action, U.S. Appl. No. 16/464,485, filed Mar. 4, 2022, 8 pages.
Notice of Allowance, U.S. Appl. No. 16/464,485, filed Jul. 21, 2022, 5 pages.
"From Cardiac Electricity Vector to Cardiac Electromagnetic", Accessed from the Internet on May 23, 2022, 2 pages.
"Modern Engineering Materials Handbook", Accessed from the Internet on May 23, 2022, 3 pages.
"New Concept of Green", Beijing Zhongguancun Promotion Center for International Protection Industry et al., 2004, 8 pages.
"New Technology in Food Industry and Application Thereof", Accessed from the Internet on May 23, 2022, 2 pages.
"Sports Shoes Design", Accessed from the Internet on May 20, 2022, 2 pages.
"Sports Shoes Design Materials", Accessed from the Internet on May 23, 2022, 3 pages.

\* cited by examiner

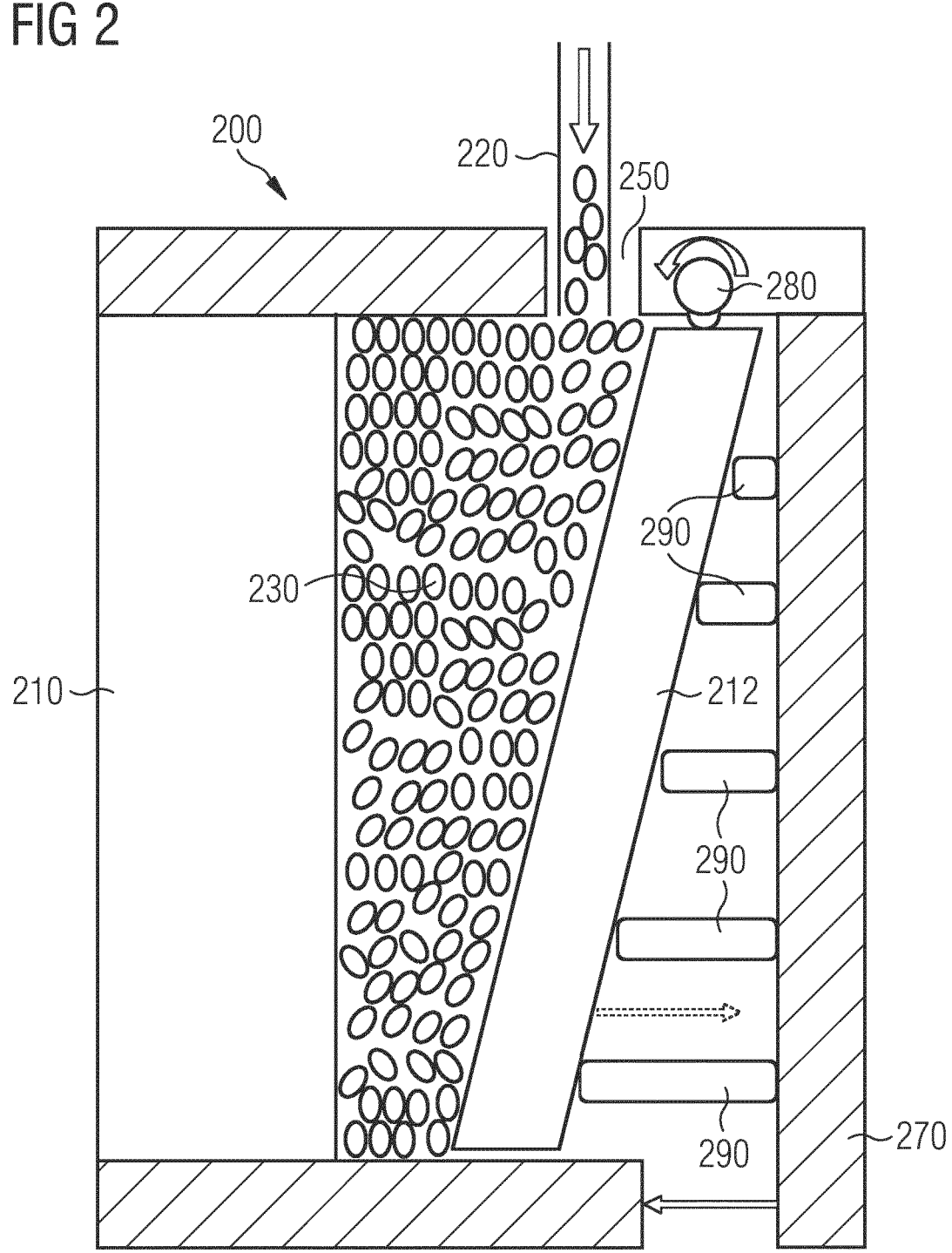

METHOD FOR THE MANUFACTURE OF A PLASTIC COMPONENT, PLASTIC COMPONENT, MIDSOLE AND SHOE

CROSS REFERENCE TO RELATED APPLICATIONS

This application is a continuation of U.S. patent application Ser. No. 16/465,485, filed May 30, 2019, entitled "Method for the Manufacture of a Plastic Component, Midsole, and Shoe" (the '485 application), which is a U.S. national phase patent application of PCT/EP2017/080420, filed Nov. 24, 2017, entitled "Method for the Manufacture of a Plastic Component, Midsole and Shoe" (the '420 application), which is based on German Patent Application No. 102016223980.5, filed on Dec. 1, 2016, entitled "Method for the Manufacture of a Plastic Component, Midsole and Shoe" (the '980 application). The '485, '420, and '980 applications are hereby incorporated herein in their entireties by this reference.

FIELD OF THE INVENTION

The present invention relates to a method for the manufacture of a plastic component, in particular a cushioning element for sports apparel, a plastic component manufactured with such a method, as well as a midsole and a shoe.

BACKGROUND

Nowadays, plastic components play an essential role in many areas of technology and everyday life. As examples, the aviation and aerospace industry as well as the automotive industry are mentioned. In these areas, plastic components may, for example, serve as impact protection elements, e.g. bumpers, or they may be used for the manufacture of panel-elements, seat shells, arm rests, and so forth. Plastic components may also be used in the packing industry, for example for packing up sensitive and easily damaged goods for delivery.

In all of these exemplary areas of application, it is beneficial if the plastic components comprise as small a weight as possible, being, however, at the same time sufficiently resilient. In particular, with regard to plastic components being used for impact protection or for safely wrapping up goods, plastic components should also comprise good cushioning and shock absorption properties with regard to blows or hits. In this context, foamed plastic materials are known from the prior art, like for example expanded polystyrene—e.g. available from the BASF under the trade names of Styropor® or Styrodur®.

The use of expanded plastic materials has also found its way into the manufacture of cushioning elements for sports apparel, for example for the manufacture of shoe soles for sports shoes.

In the art of shoe manufacturing and in particular, in the design of high performance athletic shoes a strong demand exists for improving the material properties of the individual components of a shoe, for example the flexibility, the abrasion resistance, the stiffness, the compressive strength and/or the resilience of the component as well as further physical and chemical material properties.

For instance, it may be desirable to enhance the material properties of the midsole of an athletic shoe, in order to provide a higher performance of the shoe during use, improved wearing comfort and/or increased longevity of the midsole while at the same time improving ease of manufacture.

In particular, the use of particles of expanded thermoplastic polyurethane (eTPU), which are fused together by supplying heat in the form of steam or connected by the use of a binder material as described in DE 10 2012 206 094 A1 and DE 10 2011 108 744 B1, has been considered.

Moreover, prior art document EP 2 649 896 B1 provides improved soles and insoles for shoes, in particular sports shoes and manufacturing methods thereof. In one aspect, a sole for a shoe, in particular a sports shoe, with at least a first and a second surface region is provided, wherein the first surface region comprises eTPU.

In addition, the EP 3 114 954 A1 relates to a method for the manufacture of a sole for a shoe, in particular for a sports shoe that comprises: opening a movable part of a mold to a predetermined extent, loading particles of eTPU into the mold, reducing the volume of the mold according to the shape of the sole which is to be manufactured and feeding steam to the eTPU, wherein the mechanical properties of the sole are at least partly determined by the extent to which the mold is opened during loading.

However, various aspects of the manufacturing methods described by the prior art may be further improved.

It is therefore a problem to be addressed by the present invention to further improve manufacturing methods for a plastic component comprising expanded particles such as eTPU or expanded polyether-block-amide (ePEBA) so as to improve the material properties and/or ease of manufacture of the plastic component.

Further, it is desirable to incorporate such enhanced plastic component comprising expanded particles into a midsole of a shoe and/or a shoe.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some embodiments, the disclosure relates to a method for the manufacture of a plastic component, the method comprising: a. opening a mold by a predetermined amount into a loading position; wherein the mold comprises at least two mold parts and wherein the amount by which the mold is opened influences an available loading volume of the mold; b. loading a material comprising expanded particles into the loading volume; c. closing the mold into a closed position; wherein during closing of the mold the at least two mold parts are moved together over different distances in different areas of the mold; d. compressing the expanded particles by closing the mold; e. fusing at least the surfaces of the expanded particles to mold the plastic component. The different distances may locally affect the degree of compression of the expanded particles. The different distances may be related to the thickness distribution in the molded plastic component at least for a section of the mold. The expanded particles may be partially fused together by heated steam and/or electromagnetic radiation. During closing of the mold, at least one of the mold parts may be pivoted around an eccentrically arranged swivel axis. The swivel axis may be connected to a mounting plate. Deformable spacer elements of different length may be arranged between the mounting plate and the at least one mold part. At least one of the mold parts may comprise several individual sub-parts, and wherein the different distances over which the mold parts are moved together may be individually controlled for each sub-part. The mold may be sealed after the step of loading the mold volume with expanded particles so that the remaining steps of the method are executed at a different location than the step of loading the mold. The plastic component may be a cushioning element for a sports shoe.

In some embodiments, the disclosure relates to a plastic component, comprising expanded particles, wherein the local density and/or the local compression stiffness of the plastic component is determined by the degree of local compression of the expanded particles during molding of the component. The local density and/or the local compression stiffness of the plastic component may be essentially constant in at least a portion of the plastic component. The local density and/or the local compression stiffness of the plastic component may be essentially constant in all of the plastic component. The expanded particles may comprise at least one of the following materials: expanded thermoplastic polyurethane (eTPU); expanded polyamide (ePA); expanded polyether-block-amide (ePEBA); expanded polylactide (ePLA); expanded polyethylene terephthalate (ePET); expanded polybutylene terephthalate (ePBT); expanded thermoplastic polyester ether elastomer (eTPEE). The plastic component may be produced by the method comprising: a. opening a mold by a predetermined amount into a loading position; wherein the mold comprises at least two mold parts and wherein the amount by which the mold is opened influences an available loading volume of the mold; b. loading a material comprising expanded particles into the loading volume; c. closing the mold into a closed position; wherein during closing of the mold the at least two mold parts are moved together over different distances in different areas of the mold; d. compressing the expanded particles by closing the mold; e. fusing at least the surfaces of the expanded particles to mold the plastic component. The different distances may locally affect the degree of compression of the expanded particles. The different distances may be related to the thickness distribution in the molded plastic component at least for a section of the mold. The expanded particles may be partially fused together by heated steam and/or electromagnetic radiation. During closing of the mold, at least one of the mold parts may be pivoted around an eccentrically arranged swivel axis. The swivel axis may be connected to a mounting plate. Deformable spacer elements of different length may be arranged between the mounting plate and the at least one mold part. At least one of the mold parts may comprise several individual sub-parts, and wherein the different distances over which the mold parts are moved together may be individually controlled for each sub-part. The mold may be sealed after the step of loading the mold volume with expanded particles so that the remaining steps of the method are executed at a different location than the step of loading the mold. The plastic component may be a cushioning element for a sports shoe. In some aspects, the plastic component may be a midsole and the compression stiffness of the midsole may vary by less than 20% over essentially the whole extent of the midsole. In some aspects, a shoe comprises the midsole described herein.

In some embodiments, the disclosure relates to a midsole for a shoe comprising expanded particles, wherein the local density of the midsole varies by less than 20% over essentially the whole extent of the midsole. The expanded particles may comprise at least one of the following materials: expanded thermoplastic polyurethane (eTPU); expanded polyamide (ePA); expanded polyether-block-amide (ePEBA); expanded polylactide (ePLA); expanded polyethylene terephthalate (ePET); expanded polybutylene terephthalate (ePBT); expanded thermoplastic polyester ether elastomer (eTPEE).

BRIEF DESCRIPTION OF THE DRAWINGS

In the following detailed description, embodiments of the invention are described referring to the following figures:

Embodiments of the present invention are described in more detail in the following by reference to the accompanying figures. These figures show:

FIG. 2 a schematic of a mold design adapted to be used in a method according to the present invention;

BRIEF DESCRIPTION

Figure 1A:
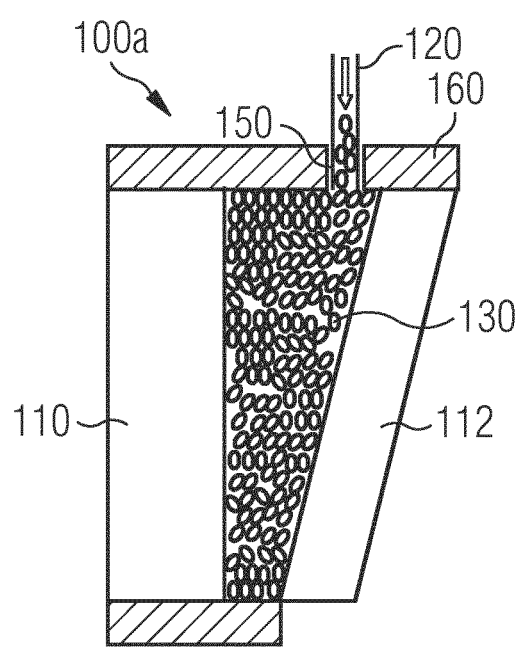
FIG. 1a: a schematic longitudinal cross-section of a mold in the loading position according to embodiments of the present invention.

The above-mentioned objectives are at least partly fulfilled by the subject matter of the claims of the present application.

In some embodiments, the present invention provides a method for the manufacture of a plastic component, in particular a cushioning element for sports apparel comprising a step of opening a mold by a predetermined amount into a loading position, wherein the mold comprises at least two mold parts and the amount by which the mold is opened influences an available loading volume of the mold, a step of loading a material comprising expanded particles into the loading volume, a step of closing the mold into a closed position, wherein during closing of the mold the mold parts are moved together over different distances in different areas of the mold, a step of compressing the expanded particles by closing the mold and a step of fusing at least the surfaces of the expanded particles to mold the plastic component.

Expanded particles are sometimes also called "foam particles", and the molded plastic components are consequently sometimes called "particle foam components". Other terms by which such expanded particles may be referred to include "beads" or "pellets", for example.

For example, the method allows to improve the control over the local compression of the expanded particles during manufacture of a plastic component such that the plastic component may exhibit superior material properties. The material properties such as the density and/or the compression stiffness of a plastic component may be tailored to a specific application or use. For example, the local density/compression stiffness of a plastic component used in athletic shoes may be optimized and adapted for different types of athletic activity, for example tennis, running, football, basketball etc. and/or optimized for different surfaces, for example forest trail, asphalt, concrete, sand, grass, hardwood, etc. and/or to the anatomical features and/or gait of individual wearers.

Moreover, such enhanced plastic component may readily be integrated into other types of sports apparel such as garments with integrated cushioning elements and/or sandals, ski boots, snowboard boots, golf shoes as well as all kinds of protective sports equipment such as gloves, in particular baseball gloves, goalkeeper gloves, and/or boxing gloves, shin guards, knee and/or elbow protectors, helmets, back protectors and many more.

Further, such enhanced plastic component may also be integrated in a broad variety of sport equipment such as skis, snowboards, skate boards, surf boards, punching targets, fitness gear and many more.

In further embodiments of the invention, the different distances over which the mold parts are moved together locally affect the degree of compression of the expanded particles.

In further embodiments, the different distances over which the mold parts are moved together are related, preferably essentially proportional, to the thickness distribution in the molded plastic component at least for a section of the mold.

For instance, it may be possible to ensure an essentially constant degree of compression and accordingly an essentially constant density in the molded plastic component. In this respect and for the remaining part of the application the term "essentially" shall be defined as "within typical manufacturing tolerances".

For example, a constant density may be desired for plastic components with non-uniform thickness such as wedge-shaped components as for example shoe soles that also require certain physical material properties that are density dependent to be essentially homogenous.

In further embodiments of the invention, the expanded particles are at least partially fused together by heated steam and/or electromagnetic radiation.

For example, these embodiments allow to mold the plastic component without relying on adhesives or gluing agents and also to distribute the heat that is required for fusing the surfaces of the expanded particles homogenously throughout the volume of the mold.

If electromagnetic radiation is employed the expanded particles are not exposed to the moisture present in heated steam, which may be desired for certain embodiments. Additionally, heating the expanded particles with electromagnetic radiation is more energy efficient and allows to control the dynamics of the fusing process more precisely.

It will be apparent to the person skilled in the art that the present invention is also compatible with other conventional molding techniques such as compression molding, and many more.

In further embodiments of the invention, during closing of the mold at least one of the mold parts is pivoted around an eccentrically arranged swivel axis, wherein the swivel axis is preferably connected to a mounting plate and wherein preferably deformable spacer elements of different length are arranged between the mounting plate and the at least one mold part.

In this respect, the term "eccentrically" is defined with respect to the transversal center line of the mold.

For example, these embodiments provide a simple way of implementing the desired different distances over which the at least two mold parts are moved together in different areas of the mold during closing of the mold.

In further embodiments of the invention, at least one of the mold parts comprises several individual sub-parts, wherein the different distances over which the mold parts are moved together may be individually controlled for each sub-part.

These embodiments allow to apply different compression schemes to the expanded particles in different portions of the mold. For example, in one portion of the mold a uniform compression may be desired and in a second portion a non-uniform compression may be desired. This could be relevant for producing a midsole of a shoe that comprises an essentially wedge-shaped portion in the midfoot and rearfoot section as well as an essentially uniform portion in the forefoot section.

In further embodiments of the invention, the mold is sealed after the step of loading the mold volume with expanded particles, such that the remaining steps of the method may be executed at a different location in space than the step of loading the mold.

For example, these embodiments allow to load the mold at a dedicated loading station of a multi-station manufacturing line for plastic components. Said loading station may be individually optimized for loading a mold with expanded particles. After loading, the sealed mold may be transported to further processing stations of the manufacturing line, for example an electromagnetic fusing station that may be individually optimized for efficient electromagnetic melding of the expanded particles. By locally separating the subsequent manufacturing steps and transporting mold from one process station to the next the manufacturing line implementing the method provided by the invention may be optimized further.

In further embodiments, the present invention provides a plastic component, in particular a cushioning element for sports apparel comprising expanded particles, wherein the local density and/or the local compression stiffness of the plastic component is determined by the degree of local compression of the expanded particles during molding the plastic component.

For example, density dependent mechanical properties of such plastic components comprising expanded particles may be designed according to specifications relevant for specific applications such as for midsoles for different kinds of athletic shoes such as basketball, tennis and or outdoor running shoes.

More specific embodiments of the present invention are related to an enhanced plastic component, wherein the local density and/or the local compression stiffness of the plastic component is essentially constant in at least a portion, preferably all of the plastic component.

Additional embodiments relate to an enhanced plastic component, wherein the local density and/or the local compression stiffness of the plastic component is related to, preferably essentially proportional to a thickness distribution in at least a portion of the plastic component.

For example, in this way plastic components may be manufactured that exhibit homogeneous mechanical properties, for example, compression stiffness and density. Furthermore, plastic components may be manufactured in a desirable way to produce improved midsoles of sports shoes.

In further embodiments, the present invention provides a plastic component comprising at least one or more of the following materials: expanded thermoplastic polyurethane (eTPU); expanded polyamide (ePA); expanded polyether-block-amide (ePEBA); expanded polylactide (ePLA); expanded polyethylene terephthalate (ePET); expanded polybutylene terephthalate (ePBT); expanded thermoplastic polyester ether elastomer (eTPEE).

Further details, regarding expanded particles such as expanded polymer pellets are given by the Applicant's DE 102014216992 A1, the WO 2016030026 A1 and the WO2016030333 A1.

For example, the superior material properties of eTPU (or similar expanded particles) allow to design enhanced cushioning elements for sports apparel. For instance, midsoles for sports shoes comprising eTPU provide enhanced wearing comfort and superior running properties. In particular, such midsole relaxes immediately to its original form after impact due its large rebound determined by the resilience of the eTPU material. As a result, impact energy stored in the elastic deformation of the midsole is re-projected to the leg of the wearer and thereby enhances running performance.

In further embodiments, the present invention provides a midsole for a shoe, in particular a sports shoe, comprising a plastic component according to the present invention and produced according to any of the methods provided by the present invention.

In further embodiments, the present invention provides a midsole for a shoe, in particular a sports shoe comprising expanded particles, wherein the local density of the midsole, varies by less than 20%, preferably by less than 15%, more preferably by less than 10% and most preferably by less than 5% over essentially the whole extent of the midsole.

The local density in the different sections of the midsole may be for example determined by any related method known in the art that also allows to reproducibly determine the density of plastic components comprising expanded particles such as expanded TPU.

Additionally or alternatively, the midsole may exhibit a compression stiffness that varies by less than 20%, preferably by less than 15%, more preferably by less than 10% and most preferably by less than 5% over essentially the whole extent of the midsole.

Additionally or alternatively, the midsole may comprise a plastic component manufactured according to any of the methods provided by the present invention.

The compression stiffness of the different sections of the midsole may be determined by any related method known in the art that also allows to reproducibly determine the compression stiffness of plastic components comprising expanded particles such as expanded TPU. One such example is a test method according to ISO 844:2014 "Rigid cellular plastics—Determination of compression properties".

In further embodiments, the present invention provides a shoe, in particular a sports shoe comprising a midsole according to the embodiments of the invention mentioned-above.

Such sports shoes for example may provide superior rebound, wearing comfort and shock cushioning and as a result ensure reduced fatigue experienced by a wearer and increased running and/or jumping performance during use.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, exemplary embodiments of the present invention are described in more detail with reference to the manufacturing of a wedge-shaped plastic component, and in particular a midsole of a sports shoe. However, it is to be understood that the present invention is not limited to such specific embodiments but could be applied to other types of plastic components, that are intended in particular to be used as cushioning elements for sports apparel and sports equipment in general. Moreover, while specific feature combinations are described in the following with respect to certain embodiments of the present invention, it is to be understood that the disclosure is not limited to such embodiments. In other words, not all features have to be present for realizing the invention and the embodiments may be modified by combining certain features of one embodiments with at least one of the features of another embodiment.

FIG. 1a depicts a longitudinal cross-section of a schematic mold design arranged in the loading position, while expanded particles 130 such as eTPU particles are loaded into the mold 100a according to some embodiments of the present invention. The loading position may also be designated as crack gap position and the mold accordingly as a crack gap mold.

In some embodiments, the expanded particles may all exhibit essentially the same size and geometrical shape, wherein in other embodiments the size and geometrical shape of the expanded particles may differ, in further embodiments the size and the geometrical shape of the expanded particles may significantly differ. In further embodiments the expanded particles may comprise particles of different materials and in particular mixtures of different polymers, in order to fine-tune the material properties of the plastic component.

The expanded particles may further comprise adhesives and/or gluing agents that facilitate the formation of the plastic component inside the mold. Moreover, the expanded particles may comprise an energy absorbing material that may for example facilitate energy transfer from an externally applied electromagnetic field to the expanded particles inside the mold.

In the presented embodiments the mold 100a is arranged below a reservoir of expanded particles 130 (not shown) such that the expanded particles 130 are loaded into the mold volume at least in part guided by gravity.

For example, the mold 100a could be loaded at a loading station from a reservoir of expanded particles 130, wherein the reservoir may be arranged above the position of the mold at the loading station. Since the reservoir is arranged above the position of the mold 100a a stream of expanded particles 130 may be guided into the mold 100a by relying mainly on gravity without the need for using pressurized air or similar means for transporting expanded particles 130. In a similar way the molded plastic component may be demolded from the mold without the need for dedicated removal means. Both effects reduce the technical complexity of manufacturing and increase efficiency.

Alternatively or additionally, the expanded particles 130 may be transported to the mold 100a and loaded into the mold volume by a transport and loading mechanism operated for example by pressurized gas and/or pressurized air. Using a loading mechanism based on pressurized gas and/or air may decrease the time needed for loading of the mold volume and thus increase production throughput.

Figure 1B:
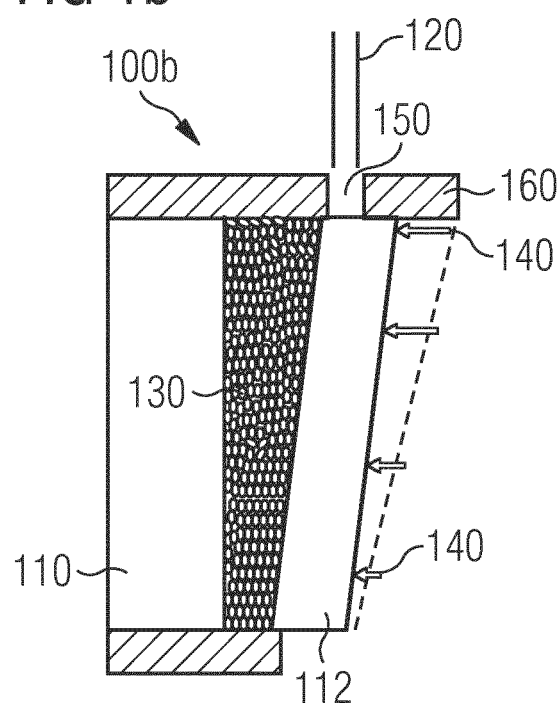
FIG. 1b: a schematic longitudinal cross-section of a mold in the closed position according to embodiments of the present invention.

The mold 100a may comprise at least two mold parts 110, 112 which in the loading position of the mold 100a may be further apart relative to each other than in a closed position (see FIG. 1b). As a consequence, the mold volume in the loading position is larger than the mold volume in the closed position.

Typically, the mold volume is essentially completely loaded with expanded particles in the loading position, wherein the expanded particles are kept essentially in a non-compressed state. The fact that the mold volume in the loading position is larger than the volume of the molded plastic component 135 that is formed in the closing position of the mold 100a facilitates to avoid forming undesired voids inside the plastic component 135 and in particular reduces the number of undesired voids on the surfaces and along the edges of the plastic component 135.

Moreover, loading the mold 100a in a loading position with larger mold volume results in less compression near the opening 150 through which the expanded particles are loaded.

It is also possible to vary the loading volume and therefore allow for a higher or lower total amount of expanded particles inside the mold prior to closing the mold 100a.

FIG. 1b depicts the mold 100b of FIG. 1a configured in the closed position after the mold volume has been loaded with expanded particles 130 and after the expanded particles 130 have been compressed inside the mold 100b by moving the mold halves 110, 112 from the loading position into the closed position.

Due to the compression experienced by the expanded particles 130 during closing the mold 100b the mold volume is essentially homogeneously loaded with expanded particles that in the closed position are in a compressed state.

In the embodiments illustrated in FIG. 1b the local distance that the mold halves are moved towards each other depends on the thickness of the plastic component such that the degree of compression of the expanded particles in the closed position is essentially constant across the extent of the plastic component.

This may be achieved by controlling the local distance $\Delta z$ over which the mold parts 110, 112 are moved together such that $\Delta z$ is essentially proportional to the thickness z of the plastic component (i.e. $\Delta z = \alpha z$ with proportionality constant $\alpha$). If the degree of compression $\lambda$ is defined as the ratio between the local distance $\Delta z$ and the local thickness z of the plastic component (i.e. $=\Delta z/z$) it is evident that the degree of compression $\lambda$ is constant and equal to the proportionality constant $\alpha$.

Such control over the degree of compression may be implemented by a crack gap mold, that is arranged such that the at least two mold parts are arranged pivotable with respect to each other. In particular, one of the mold parts or both may be mounted at an eccentric pivot axis such that the essentially constant degree of compression is achieved by the one of the mold parts performing a swivelling movement around said eccentric pivot axis and thereby compressing the expanded particles uniformly.

For other applications of the present invention it may be desirable to produce plastic components that exhibit a degree of compression $\lambda$ that is proportional to the local thickness z of the plastic component 135 (i.e. $\lambda=\beta z$). This may be achieved by controlling the local distance $\Delta z$ over which the mold parts 110, 112 are moved together such that $\Delta z$ is essentially a quadratic function of the local thickness z of the plastic component 135 (i.e. $\Delta z=\beta z2$).

For further embodiments it may be desirable to produce components that exhibit a degree of compression $\lambda$ that is inversely proportional to the local thickness z of the plastic component 135 (i.e. $=y/z$). This may be achieved by controlling the local distance $\Delta z$ over which the mold parts 110, 112 are moved together such that $\Delta z$ is constant (i.e. $\Delta z=7$).

In general, the local thickness z of the plastic component 135 depends on the exact position in the x-y plane of the plastic component i.e. the local thickness z is a piecewise continuous function $z=z(x, y)$ of the position in the x-y plane.

The local distance $\Delta z$ in turn over which the mold parts 110, 112 are moved together during closing of the mold may in general also be a continuous function of the local thickness i.e. $\Delta z=\Delta z(z)$. In this manner the local degree of compression $\lambda=\Delta z/z$ becomes also a piecewise continuous function of the position in the x-y plane.

If for example, $\Delta z$ is a polynomial of degree n in the thickness z than the degree of compression is a polynomial of degree n-1 in the local thickness z. The above arguments may be readily generalized to other types of functions such as trigonometric functions or exponentials.

Certain mold configurations may allow to directly control the degree of compression $\lambda$ as a quasi-continuous function of position in the x-y plane. This may be achieved by adapting at least one of the mold parts 110, 112 such that it comprises a plurality of individually controllable mold elements that are small compared to the extent of the plastic component 135. This technique could for example allow to individually adapt the degree of compression of a midsole of a sports shoe to the anatomical shape of the foot of an individual wearer.

The mold 100b may further comprise means 160 for closing the opening 150 through which the expanded particles 130 are loaded into the mold volume in the loading position. In some embodiments, the means 160 for closing the opening 150 may be integrated in the mold 100b. In other embodiments the means 160 for closing the opening 150 may also be separate from the mold 100b and may be detached for loading and attached after loading is completed. In even further embodiments, the opening 150 may be closed from the inside of the mold volume by an outer surface portion of one of the mold parts 110, 112.

Figure 1C:
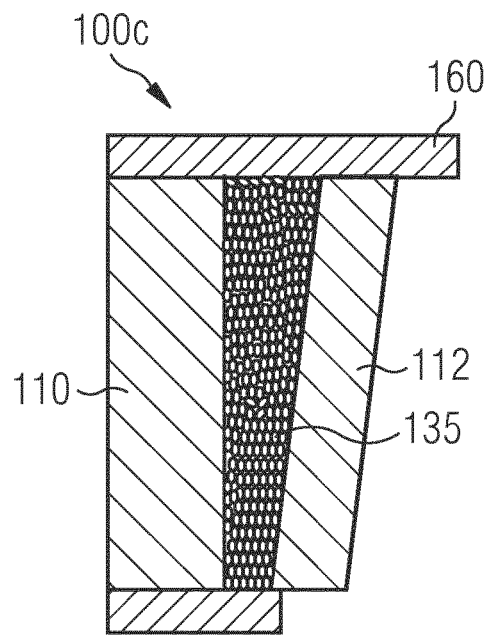
FIG. 1c: a schematic longitudinal cross-section of a mold in the closed position and during fusing of the expanded particles according to embodiments of the present invention.

FIG. 1c depicts the mold of FIG. 1a and FIG. 1b during fusing of the expanded particles.

In some embodiments, the expanded particles 130 may be fused together by heating the expanded particles above a respective temperature such that the surface portions of the expanded particles melt together and form an essentially completely connected plastic component 135.

In some embodiments the heat may be supplied by heated steam that is fed into the mold volume.

In some embodiments heat may additionally be supplied by heating at some portions of the mold as for example the two mold parts 110, 112.

In further embodiments heat may be supplied by electromagnetic radiation such as RF, MW, Laser, UV or X-ray radiation. The mold parts 110, 112 may serve as capacitor plates that may be connected to a high-power RF or MW amplifier.

In order to enhance the energy transfer from the electromagnetic radiation to the expanded particles 130, the expanded particles 130 may comprises at least one energy absorbing material that exhibits a large absorption cross-section in the corresponding part of the electromagnetic spectrum occupied by the electromagnetic radiation that is supplying the energy for heating and fusing the expanded particles 130.

In some embodiments, the mold 100c may be sealed in the closed position. After the mold 100c is sealed it may be transported from a loading station that was used to load the mold volume with the expanded particles 130 to a dedicated fusing station where fusing the expanded particles 130 takes place for example by RF or MW heating and/or steam heating.

Such a method may allow to design flexible and highly automated manufacturing lines that employ modular process stations for example loading, compression, fusing, cooling, demolding stations. The modular design of the production process allows to optimize the design and the operation of each of the stations of the production process independently.

Figure 1D:
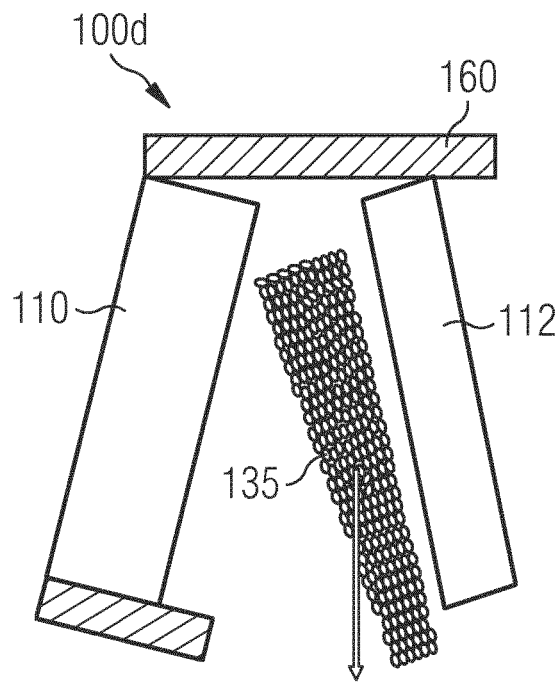
FIG. 1d: a schematic longitudinal cross-section of a mold in the during releasing the plastic component from the according to embodiments of the present invention.

FIG. 1d depicts the mold 100d of FIGS. 1a-1c in a configuration when molding the plastic component 135 has been finished and the plastic component 135 is being demolded from the mold 100d. In some embodiments the mold 100d is oriented such that the plastic component can fall out of the mold 100d by being subjected to gravity, such that no dedicated removal means need to be present. In other embodiments dedicated removal means may be employed however.

In some embodiments, wherein the mold may have been sealed after loading the mold with expanded particles, demolding the plastic component may take place at a different location then loading the mold and/or fusing the expanded particles.

For some embodiments, the mold 100d may be configured such that the two mold parts 110, 112 are attached to the mold assembly such that they may be easily opened after the plastic component 135 is molded and sufficiently cooled to be ready for demolding.

The production process schematically depicted in FIG. 1a-1d may be configured such that after demolding the molded part 135 form the mold 100d (as shown in FIG. 1d), the mold 100d may be cleaned for example by pressurized air and may be transported back to the loading station (see FIG. 1a) such that the production process may be reinitiated.

In other embodiments, for which all process steps are executed at the same location (i.e. at a combined loading, compression, fusing, demolding station), the mold 100d just requires to be put back into the loading configuration illustrated in FIG. 1a in order to start the production process anew.

FIG. 2 depicts a particular mold design that allows to implement at least some of the methods of manufacture provided by the present invention. In detail, the mold 200 comprises two mold parts 210 and 212, wherein the first mold parts 212 may be pivoted around an eccentrically arranged swivel axis 280. The swivel axis in turn is connected to a mounting plate 270, such that when the mounting plate 280 is pressed towards the other mold part 210 the first mold part 212 is pivoted around the swivel axis 280 by the pressure resulting from compressing the expanded particles 230 loaded into the mold volume.

The eccentrically swivel axis is arranged eccentrically with respect to the transversal center line of the mold, resulting in different position dependent distances over which the two mold parts 210 and 212 are moved together, when the first mold part 212 is pivoted around the eccentrically arranged swivel axis 280.

In order to produce wedge-shape plastic components, deformable spacers 290, for example spring elements, may be arranged between the mounting plate 270 and the first mold part 212.

The deformable spacers 290 ensure that the two mold parts 210 and 212 form a wedge-shape loading volume during loading of the mold 200 with expanded particles 230 while arranged in the loading position.

The combination of the eccentrically arranged swivel axis 280 with the deformable spacers 290, that may exhibit different dimensions at different positions along the mounting plate 270, allows to adjust the angle between the two mold parts 210 and 212 in the loading position.

As a consequence, the two mold parts are moved together over different distances in different areas of the mold 200 during closing of the mold resulting in a position dependent degree of compression along the longitudinal extension of the mold 200.

Figure 3A:
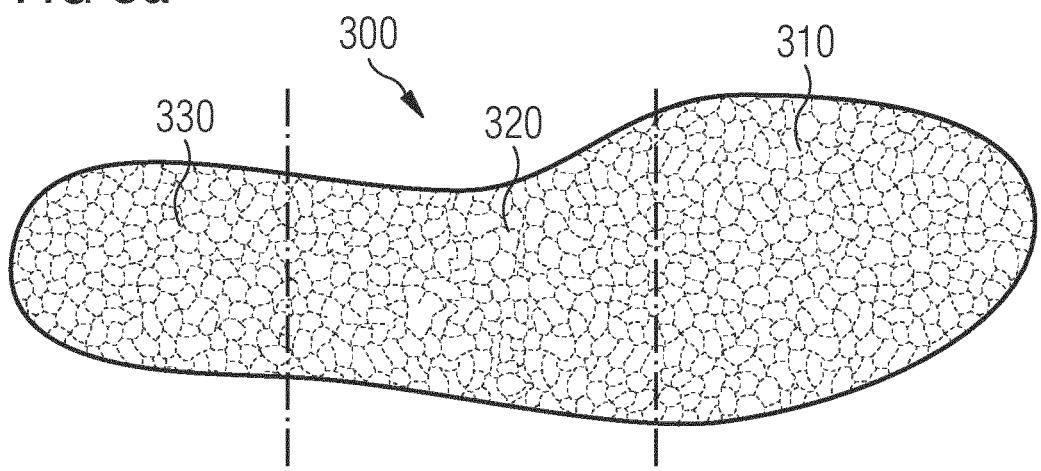
FIG. 3a: a bottom view of a midsole of an athletic shoe according to embodiments of the present invention.

FIG. 3a depicts a bottom view of an exemplary midsole 300 produced according to the presented invention the midsole may comprise a forefoot section 310, a midfoot section 320 and a rearfoot section 330.

In some embodiments all section exhibit a different thickness either varying continuously across the midsole 300 or discontinuously. Combinations thereof are also possible, for example the midsole 300 may be configured such that the thickness varies continuously from the forefoot 310 to midfoot section 320 and discontinuously from the midfoot section 320 to the rearfoot section 330.

Midsoles 300 according to the present invention may also exhibit a constant or varying density in the respective sections. As for the thickness distribution, the density may also either vary continuously and or discontinuously from one section to the adjacent one.

Figure 3B:
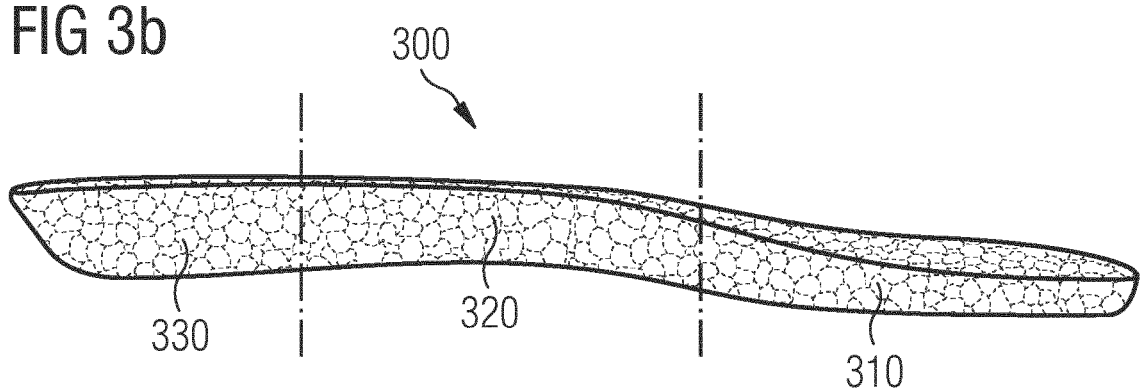
FIG. 3b: a side view of a midsole of an athletic shoe according to embodiments of the present invention.

FIG. 3b depicts a lateral view of the midsole 300 of FIG. 3a. The illustrated embodiment shows a continuously varying thickness distribution and a non-constant degree of compression. In particular, the expanded particles in the forefoot section 310 are in a more compressed state than in the midfoot 320 and the rearfoot section 330. This could for example result in a larger rebound in the rear foot 330 and the midfoot section 320 than in the forefoot section 310 as it may be desired for certain types of athletic shoes.

For other types of athletic shoes however it could also be desired, that the expanded particles in the forefoot section 310 may be compressed to the same degree as the expanded particles in the midfoot 320 and/or the rearfoot section 330. This may be for example achieved by one of the embodiments of the present invention that provides for compression distances at are essentially proportional to the thickness distribution of the midsole 300.

Figure 3C:
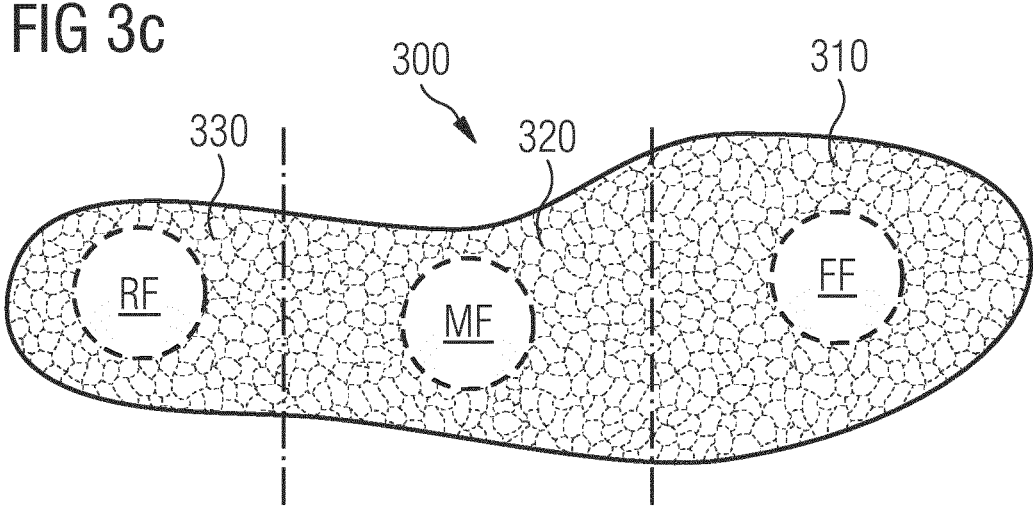
FIG. 3c: a bottom view of a midsole of an athletic shoe according to embodiments of the present invention.

FIG. 3c depicts the bottom view of FIG. 3a of a midsole 300 exhibiting an essentially constant degree of compression and/or essentially constant density over essentially the whole extent of the midsole 300. The embodiments shown in FIG. 3c have been modified by cutting three essentially cylindrically samples pieces FF, MF, RF out of the midsole 300, wherein each sample piece has been cut out from the forefoot section 310, the midfoot section 320 and the rearfoot section 330 of the midsole 300, respectively.

In order to determine the variation of the local density across the extent of the midsole 300 the density of each sample piece FF, MF, RF may be determined by a density measurement method suitable to measure the density of plastic components comprising expanded particles.

In case a more detailed density profile of the midsole 300 is required, the size of the sample pieces may be reduced and/or the number of sample pieces that may be cut out of the midsole may be increased.

Figure 4:
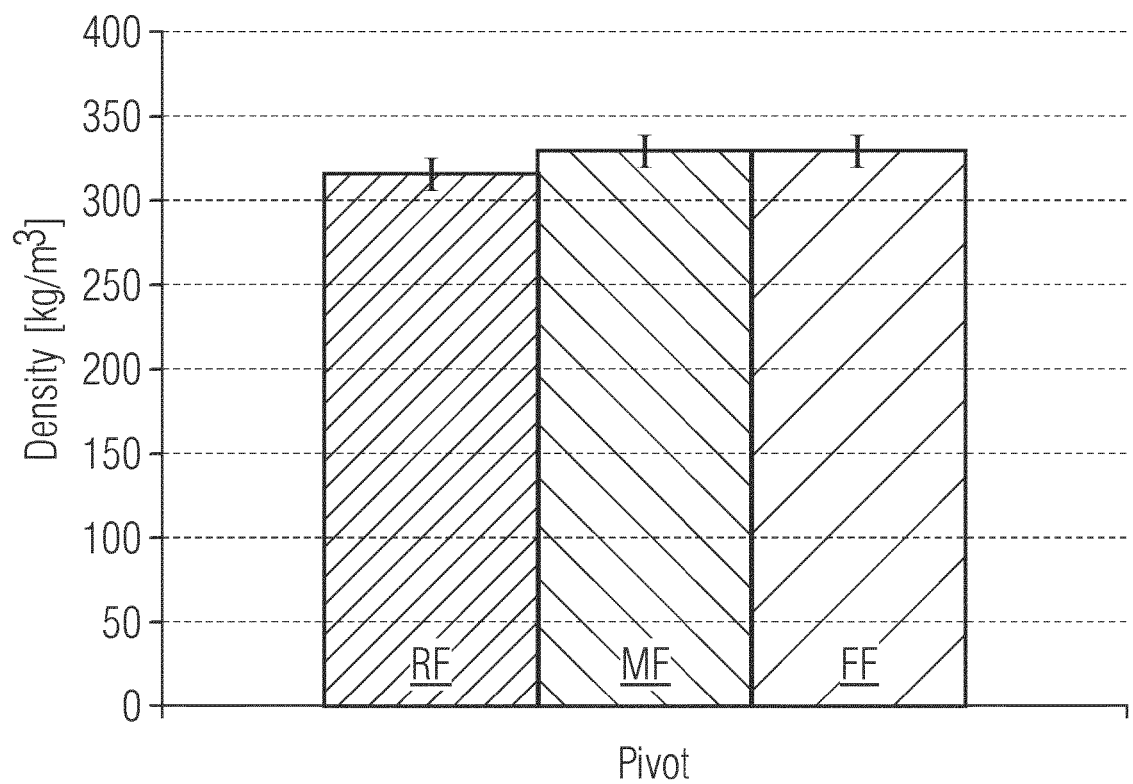
FIG. 4: a comparison the variation of density of midsoles produced according to the present invention and of midsoles produced by conventional molding techniques for expanded particles.

FIG. 4 shows the results of a density measurement performed on midsoles produced according to the present invention similar to the one depicted in FIG. 3c and by using sample pieces of similar shape as illustrated in FIG. 3c.

FIG. 4 shows the density of the sample pieces each taken from the forefoot section FF, the midfoot section MF and the rearfoot section RF of a midsole 300 produced according to a method provided by the present invention. In particular, for producing the test sample midsoles used for the density measurement shown in FIG. 4, a mold design similar to the one depicted in FIG. 2 has been employed.

Consequently, the expanded particles have essentially been compressed uniformly during molding of the test sample midsoles.

As a result, the local density of the midsole varies by less than 4% between the rearfoot section and the midfoot section and between the rearfoot section and the forefoot section. In particular, essentially no variation of density between the midfoot and the forefoot section could be determined within the statistical uncertainty of the measurement.

The shown results have been obtained by averaging the measurements over 5 test samples of midsoles 300 produced with the same method of manufacture, the same mold and the same nominal process parameters.

For example, the average density of the midsole may be between 250 kg/m3 and 400 kg/m3, preferably between 275 kg/m3 and 375 kg/m3, more preferably between 300 kg/m3 and 350 kg/m3 and most preferably between 315 kg/m3 and 335 kg/m3.

However, it will be apparent to those skilled in the art that the absolute values mentioned above and shown in FIG. 4 are exemplary only. The absolute density of the midsole 300 may depend on various parameters such as the density of the expanded particles, the type of polymer used in producing the expanded particles, the degree of expansion the expanded particles underwent during manufacturing, the degree of compression the expanded particles underwent during molding of the midsole 300 and the required compression stiffness of the midsole 300.

In contrast to the present invention molding techniques known from the prior art (e.g. as described in the underlying priority application) result in larger variations of the local density across essentially the whole extent of the midsole 300.

In the following, further examples are described to facilitate the understanding of the invention:

Example 1: Method for the manufacture of a plastic component (135), in particular a cushioning element for sports apparel, the method comprising: a. opening a mold (100) by a predetermined amount into a loading position; wherein the mold (100) comprises at least two mold parts (110, 112) and wherein the amount by which the mold (100) is opened influences an available loading volume of the mold (100); b. loading a material comprising expanded particles (130) into the loading volume; c. closing the mold (100) into a closed position; wherein during closing of the mold (100) the mold parts (110, 112) are moved together over different distances (140) in different areas of the mold (100); d. compressing the expanded particles (130) by closing the mold (100); e. fusing at least the surfaces of the expanded particles (130) to mold the plastic component (135).

Example 2: Method according to Example 1, wherein the different distances (140) locally affect the degree of compression of the expanded particles (130).

Example 3: Method according to Example 2, wherein the different distances (140) are related, preferably essentially proportional, to the thickness distribution in the molded plastic component (135) at least for a section of the mold.

Example 4: Method according to any of the preceding Examples, wherein the expanded particles (130) are partially fused together by heated steam and/or electromagnetic radiation.

Example 5: Method according to any of the preceding Examples. wherein during closing of the mold (200) at least one of the mold parts (212) is pivoted around an eccentrically arranged swivel axis (280); wherein the swivel axis (280) is preferably connected to a mounting plate (270); and wherein preferably deformable spacer elements (290) of different length are arranged between the mounting plate (270) and the at least one mold part (212).

Example 6: Method according to any of the preceding Examples, wherein at least one of the mold parts (110, 112) comprises several individual sub-parts, and wherein the different distances (140) over which the mold parts (110, 112) are moved together may be individually controlled for each sub-part.

Example 7: Method according to any of the previous Examples, wherein the mold (100) is sealed after the step of loading the mold volume with expanded particles (130), such that the remaining steps of the method may be executed at a different location than the step of loading the mold (100).

Example 8: Plastic component (135), in particular a cushioning element for a sports shoe comprising: a. expanded particles (130), b. wherein the local density and/or the local compression stiffness of the plastic component (135) is determined by the degree of local compression of the expanded particles (130) during molding the component (135).

Example 9: Plastic component (135) according to Example 8, wherein the local density and/or the local compression stiffness of the plastic component (135) is essentially constant in at least a portion, preferably all of the plastic component (135).

Example 10: Plastic component (135) according to any of the Examples 8-9, wherein the expanded particles (130) comprise at least one of the following materials: expanded thermoplastic polyurethane (eTPU); expanded polyamide (ePA); expanded polyether-block-amide (ePEBA); expanded polylactide (ePLA); expanded polyethylene terephthalate (ePET); expanded polybutylene terephthalate (ePBT); expanded thermoplastic polyester ether elastomer (eTPEE).

Example 11: Midsole (300) for a shoe, in particular a sports shoe, comprising a plastic component (135)

according to any of the Examples 8-10 and produced according to any of the Examples 1-7.

Example 12: Midsole (300) for a shoe, in particular a sports shoe comprising expanded particles, wherein the local density of the midsole (300), varies by less than 20%, preferably by less than 15%, more preferably by less than 10% and most preferably by less than 5% over essentially the whole extent of the midsole (300).

Example 13: Midsole (300) according to any of the Examples 11 or 12, wherein the compression stiffness of the midsole (300) varies by less than 20%, preferably by less than 15%, more preferably by less than 10% and most preferably by less than 5% over essentially the whole extent of the midsole (300).

Example 14: Shoe, in particular a sports shoe, comprising a midsole (300) according to any of the Examples 11-13.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The invention claimed is:

1. A method for the manufacture of a plastic component, the method comprising:
   a. opening a mold by a predetermined amount into a loading position; wherein the mold comprises at least a first moveable mold part and a second moveable mold part, and wherein the amount by which the mold is opened influences an available loading volume of the mold;
   b. loading a material comprising expanded particles into the mold; wherein the material is loaded between the first moveable mold part and the second moveable mold part;
   c. closing the mold into a closed position; wherein during closing of the mold the first moveable mold part and the second moveable mold part are moved together over different distances in different areas of the mold; wherein the different distances locally affect the degree of compression of the expanded particles, wherein the different distances are essentially proportional, to the thickness distribution in the molded plastic component at least for a section of the mold;
   d. compressing the expanded particles by closing the mold; and
   e. fusing at least the surfaces of the expanded particles to mold the plastic component;
   f. wherein the mold has a larger volume in an open position than in a closed position.

2. The method according to claim 1, wherein the expanded particles are partially fused together by heated steam and/or electromagnetic radiation.

3. The method according to claim 1, wherein the mold comprises deformable spacer elements have different lengths.

4. The method according to claim 1, wherein at least one of the moveable mold parts comprises several individual sub-parts, and wherein the different distances over which the mold parts are moved together may be individually controlled for each sub-part.

5. The method according to claim 1, wherein the mold is sealed after the step of loading the mold volume with expanded particles so that the remaining steps of the method are executed at a different location than the step of loading the mold.

6. The method according to claim 1, wherein the expanded particles are partially fused together by heated steam.

7. The method according to claim 1, wherein the expanded particles are partially fused together by electromagnetic radiation.

8. The method according to claim 1, wherein the expanded particles comprise at least one of the following materials: expanded thermoplastic polyurethane (eTPU); expanded polyamide (ePA); expanded polyether-block-amide (ePEBA); expanded polylactide (ePLA); expanded polyethylene terephthalate (ePET); expanded polybutylene terephthalate (ePBT); expanded thermoplastic polyester ether elastomer (eTPEE), and combinations thereof.

9. The method according to claim 1, wherein the plastic component has an essentially constant degree of compression.

10. The method according to claim 1, wherein the plastic component has a non-uniform thickness.

11. The method according to claim 1, wherein the method is conducted in the absence of adhesives or gluing agents.

12. The method according to claim 1, wherein a first portion of the mold forms a first portion of the plastic component with a uniform compression and a second portion of the mold forms a second portion of the plastic component with a non-uniform compression.

13. The method according to claim 1, wherein the plastic component is a midsole for a sports shoe.

14. The method according to claim 13, wherein local density in the midsole varies by less than 20% over essentially the whole midsole.

15. The method according to claim 13, wherein compression stiffness in the midsole varies by less than 20% over essentially the whole midsole.

16. The method according to claim 1, wherein the material further comprises an energy absorbing material.

17. The method according to claim 1, wherein the material is loaded into the mold from a reservoir arranged above the position of the mold and wherein the material is loaded by gravity.

18. A plastic component formed by the method according to claim 1.

* * * * *